United States Patent
Matiukhov

(10) Patent No.: US 12,056,945 B2
(45) Date of Patent: Aug. 6, 2024

(54) METHOD AND SYSTEM FOR EXTRACTING INFORMATION FROM A DOCUMENT IMAGE

(71) Applicant: KYOCERA DOCUMENT SOLUTIONS INC., Osaka (JP)

(72) Inventor: Andrii Matiukhov, Moraga, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 842 days.

(21) Appl. No.: 17/098,902

(22) Filed: Nov. 16, 2020

(65) Prior Publication Data

US 2022/0156490 A1    May 19, 2022

(51) Int. Cl.
| | | |
|---|---|---|
| G06V 30/19 | (2022.01) | |
| G06F 18/20 | (2023.01) | |
| G06F 18/21 | (2023.01) | |
| G06F 18/214 | (2023.01) | |
| G06F 18/40 | (2023.01) | |
| G06N 20/00 | (2019.01) | |
| G06V 10/40 | (2022.01) | |
| G06V 30/416 | (2022.01) | |

(52) U.S. Cl.
CPC ............ *G06V 30/19* (2022.01); *G06F 18/214* (2023.01); *G06F 18/217* (2023.01); *G06F 18/285* (2023.01); *G06F 18/40* (2023.01); *G06N 20/00* (2019.01); *G06V 10/40* (2022.01); *G06V 30/416* (2022.01); *G06V 2201/10* (2022.01)

(58) Field of Classification Search
None
See application file for complete search history.

(56) References Cited

U.S. PATENT DOCUMENTS

| | | |
|---|---|---|
| 10,223,586 B1 | 3/2019 | Leibovitz et al. |
| 10,268,883 B2 | 4/2019 | Sarkar et al. |
| 2018/0060302 A1* | 3/2018 | Liang ............... G06F 16/35 |
| 2019/0171875 A1* | 6/2019 | Northrup ............ G06V 30/413 |
| 2019/0332666 A1 | 10/2019 | Dadachev et al. |
| 2019/0355346 A1 | 11/2019 | Bellegarda |

(Continued)

OTHER PUBLICATIONS

Aggarwal, N., How to implement document tagging with AutoML, https://cloud.google.com/blog/products/ai-machine-learning/how-to-implement-document-tagging-with-automl, dated Jun. 28, 2019, accessed Feb. 12, 2021.

(Continued)

*Primary Examiner* — Delomia L Gilliard
(74) *Attorney, Agent, or Firm* — GrowIP Law Group LLC

(57) ABSTRACT

A method performed by a computing system includes receiving, by a document data extraction system (DDES), image data associated with a document. The DDES extracts, via optical character recognition (OCR) logic of the DDES, metadata from the image data. The metadata specifies sequences of text content items and text content item features associated with each text content item of the sequences of text content items. A machine learning logic (MLL) module of the DDES determines, based on the sequences of text content items and the text content item features, one or more text content items associated with a key. The DDES communicates information that specifies the key and a corresponding value that is associated with the one or more text content items that are associated with the key to a terminal.

20 Claims, 10 Drawing Sheets

(56) References Cited

U.S. PATENT DOCUMENTS

2020/0286002 A1* 9/2020 Szanto .................... G06F 18/24
2021/0366099 A1* 11/2021 Liao ...................... G06F 40/216
2022/0319219 A1* 10/2022 Tsibulevskiy ............. G06T 3/60

OTHER PUBLICATIONS

Dargan, S., Paper Synopsis: Extracting structured data from invoices, https://medium.com/analytics-vidhya/paper-synopsis-extracting-structured-data-from-invoices-2e08477100a2, dated May 28, 2019, accessed Feb. 23, 2021.

Data extractor for PDF invoices—invoice2data, https://github.com/invoice-x/invoice2data, accessed Feb. 15, 2021.

Ilin, I., Chikin, V., Solodskih, K., Deep learning for specific information extraction from unstructured texts, https://towardsdatascience.com/deep-learning-for-specific-information-extraction-from-unstructured-texts-12c5b9dceada, dated Jul. 21, 2018, accessed Feb. 15, 2021.

Keyword Extraction, https://monkeylearn.com/keyword-extraction/, accessed Feb. 15, 2021.

Liu, W., Wan, B., Zhang, Y., Unstructured Document Recognition on Business Invoice, cs229.stanford.edu/proj2016/report/LiuWanZhang-UnstructuredDocumentRecognitionOnBusinessInvoice-report.pdf, accessed Feb. 15, 2021.

Liu, X., Gao, F., Zhang, Q., Zhao, H., Graph Convolution for Multimodal Information Extraction from Visually Rich Documents, https://www.aclweb.org/anthology/N19-2005.pdf, dated Jun. 2, 2019-Jun. 7, 2019, accessed Feb. 16, 2021.

Manning, C., Information Extraction and Named Entity Recognition, https://web.stanford.edu/class/cs124/lec/Information_Extraction_and_Named_Entity_Recognition.pdf, accessed Feb. 16, 2021.

Sable, A., Automating Invoice Processing with OCR and Deep Learning, https://nanonets.com/blog/invoice-ocr/, dated Feb. 9, 2021, accessed Feb. 15, 2021.

Sterbak, T., Named entity recognition with Bert, https://www.depends-on-the-definition.com/named-entity-recognition-with-bert/, dated Apr. 24, 2020, accessed Feb. 15, 2021.

* cited by examiner

```
"Pages": [
  {
    "PageIndex": 0,
    "Blocks": [
      {
        "value": ["Page: 2 of 5 Issue Date: Oct 07, 2017 Account Number: 123 4567 890"]  ⟵ 405
        "Rectangle": "1198, 79, 343, 77",
        "Paragraphs": [
          {
            "value": "Page: 2 of 5"
            "Rectangle": "1308, 79, 109, 21",
            "Words": [
              {
                "StartIndex": 0,                    ⟵ 410A
                "EndIndex": 3,
                "LineIndex": 0,
                "Rectangle": "1308, 80, 42, 16",
                "DistanceToOrigin": 1310.44,        ⟵ 410B
                "Area": 672.0,
                "value": "Page:",
                "Type": 0,
                "Tag": 0,
                "IsMarkedToExtract": false,
                "LabelId": -1
              },
              {
                "StartIndex": 4,                    ⟵ 410A
                "EndIndex": 6,
                "LineIndex": 0,
                "Rectangle": "1374, 79, 28, 16",
                "DistanceToOrigin": 1376.26,        ⟵ 410B
                "Area": 448.0,
                "value": "2",
                "Type": 0,
                "Tag": 0,
                "IsMarkedToExtract": false,
                "LabelId": -1
              },
```

*Fig. 4A*

METHOD AND SYSTEM FOR EXTRACTING INFORMATION FROM A DOCUMENT IMAGE

BACKGROUND

Field

This application generally relates to document processing. In particular, this application describes a method and system for extracting information from a document image.

Description of Related Art

Document data processing can be a time-consuming task. In some cases, the documents are processed manually. For example, teams of data entry personal may be tasked with entering data specified on a document into a system. The accuracy of the processing can depend on the skill of a particular data entry personal processor. But even the most skilled data entry personal are prone to making errors, especially when processing hundreds of documents a day.

SUMMARY

In a first aspect, a method performed by a computing system comprises receiving, by a document data extraction system (DDES), image data associated with a document. The DDES extracts, via optical character recognition (OCR) logic of the DDES, metadata from the image data. The metadata specifies sequences of text content items and text content item features associated with each text content item of the sequences of text content items. A machine learning logic (MLL) module of the DDES determines, based on the sequences of text content items and the text content item features, one or more text content items associated with a key. The DDES communicates information that specifies the key and a corresponding value that is associated with the one or more text content items that are associated with the key to a terminal.

In a second aspect, a document data extraction system (DDES) includes a memory that stores instruction code and a processor in communication with the memory. The instruction code is executable by the processor to perform operations that include receiving, by the document data extraction system (DDES), image data associated with a document. The operations further include extracting, by optical character recognition (OCR) logic of the DDES, metadata from the image data. The metadata specifies sequences of text content items and text content item features associated with each text content item of the sequences of text content items. A machine learning logic module of the DDES determines, based on the sequences of text content items and the text content item features, one or more text content items associated with a key. The DDES communicates to a terminal, information that specifies the key and a corresponding value that is associated with the one or more text content items that are associated with the key.

In a third aspect, a non-transitory computer-readable medium is provided. The non-transitory computer-readable medium stores instruction code that is executable by a processor for causing the processor to perform operations that include receiving, by the document data extraction system (DDES), image data associated with a document. The operations further include extracting, by optical character recognition (OCR) logic of the DDES, metadata from the image data. The metadata specifies sequences of text content items and text content item features associated with each text content item of the sequences of text content items. A machine learning logic module of the DDES determines, based on the sequences of text content items and the text content item features, one or more text content items associated with a key. The DDES communicates to a terminal, information that specifies the key and a corresponding value that is associated with the one or more text content items that are associated with the key.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

FIG. 4A illustrates a portion of metadata extracted by the OCR logic of the DDES, in accordance with an example.

DETAILED DESCRIPTION

Figure 1:
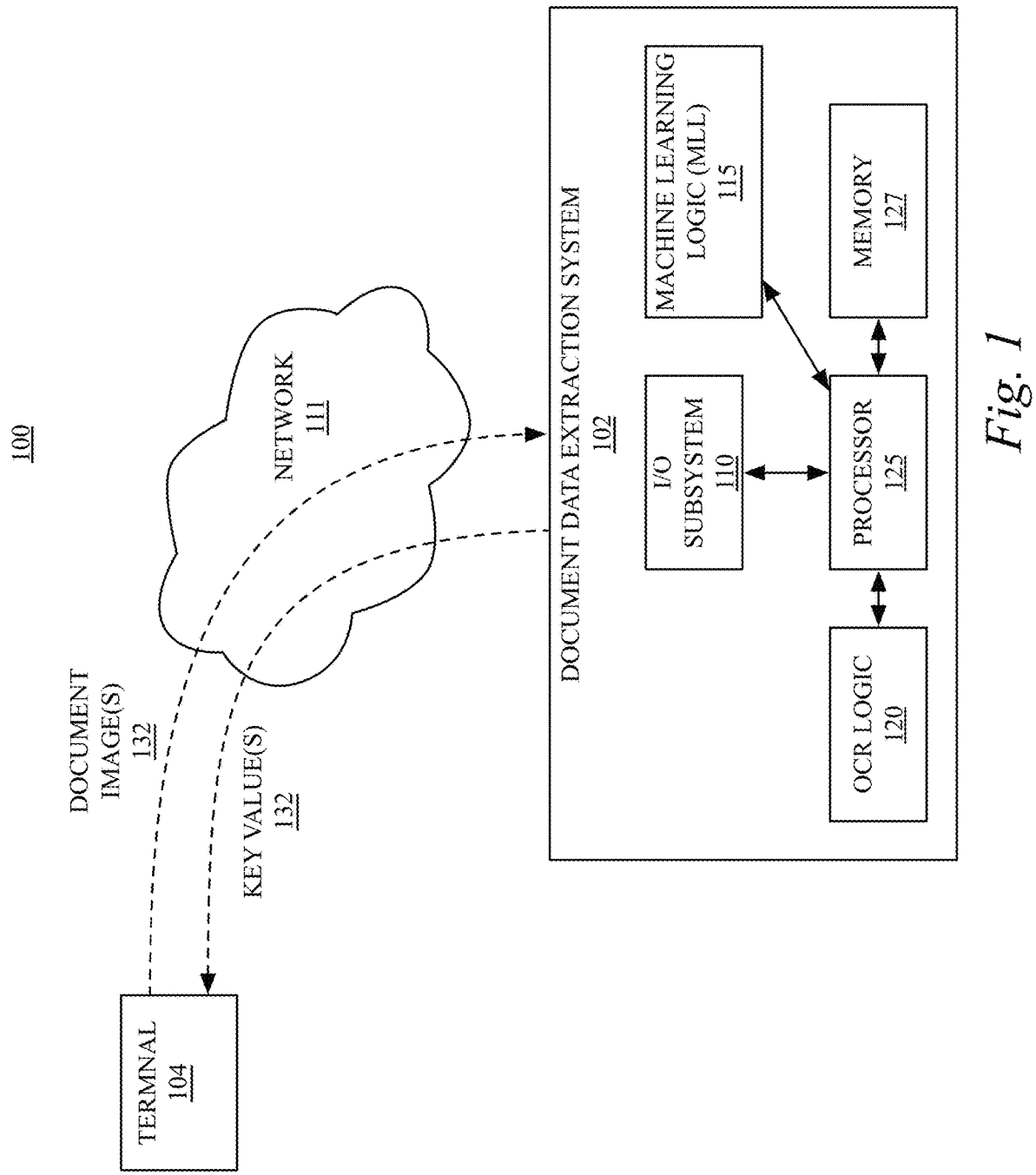
FIG. 1 illustrates an environment that includes various entities that cooperate to facilitate extracting information from a document image, in accordance with an example.

Implementations of this disclosure provide technological improvements that are particular to computing technology. In particular, these implementations reduce the computing power and time required by computing systems to classify documents. Further, various forms of machine learning logic are implemented and utilized in the classification of the documents. The implementations disclosed herein facilitate training the machine learning logic with a relatively small database of training documents, thus obviating the requirement for a large dataset of documents that would otherwise be required. This, in turn, reduces the storage requirements of the computing system.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein, are meant that the recited characteristic, parameter, or value need not be achieved exactly, but that deviations or variations, including, for example, tolerances, measurement error, measurement accuracy limitations and other factors known to one skilled in the art, may occur in amounts that do not preclude the effect the characteristic was intended to provide.

I. Introduction

As noted above, document data processing can be a time-consuming task and prone to error, especially when performed manually by teams of data entry personal. In some cases, a system can be configured to automatically read data from documents, which can be an improvement. For example, in one example, documents having the same layout can be scanned via optical character recognition software. The software can be configured to associate specific regions of the document with specific files. For example, the OCR software can be configured to associate any characters within a specific rectangular region of the document as corresponding to an account number. Unfortunately, this manner of data extraction requires that the documents being OCR's conform to a strict template and follow a somewhat rigid template.

In another example, machine learning techniques can be utilized to automatically read data from documents. For example, a classifier can be utilized to classify text on a document as being associated with a specific field. Training involves inputting document data into an input layer of the classifier and adjusting weights of the classifier to drive the output layer of the classifier to generate a vector of probabilities that matches a particular requirement. Unfortunately, the batch size of documents needed to train the classifier to be effective can be in hundreds of thousands. In many cases, there simply isn't enough training data available to train the classifier.

Examples of a document data extraction system (DDES) and document data extraction method that can overcome these drawbacks are described below. One example of the DDES is configured to receive image data associated with a document. Optical character recognition (OCR) logic of the DDES extracts metadata from the image data. The metadata specifies sequences of text content items and text content item features associated with each text content item of the sequences of text content items. A machine learning logic module of the DDES determines one or more text content items associated with a key based on the sequences of text content items and the text content item features. The DDES communicates information that specifies the key and a corresponding value that is associated with the one or more text content items that are associated with the key to a terminal.

FIG. 1 illustrates an example of an environment 100 that includes various entities that cooperate to facilitate extracting information from a document image 132. Example entities of the environment 100 include a document data extraction system (DDES) 102 and a terminal 104. In some examples, the various entities of the environment 100 are configured to communicate with one another via a network 111, such as the Internet.

Figure 3:
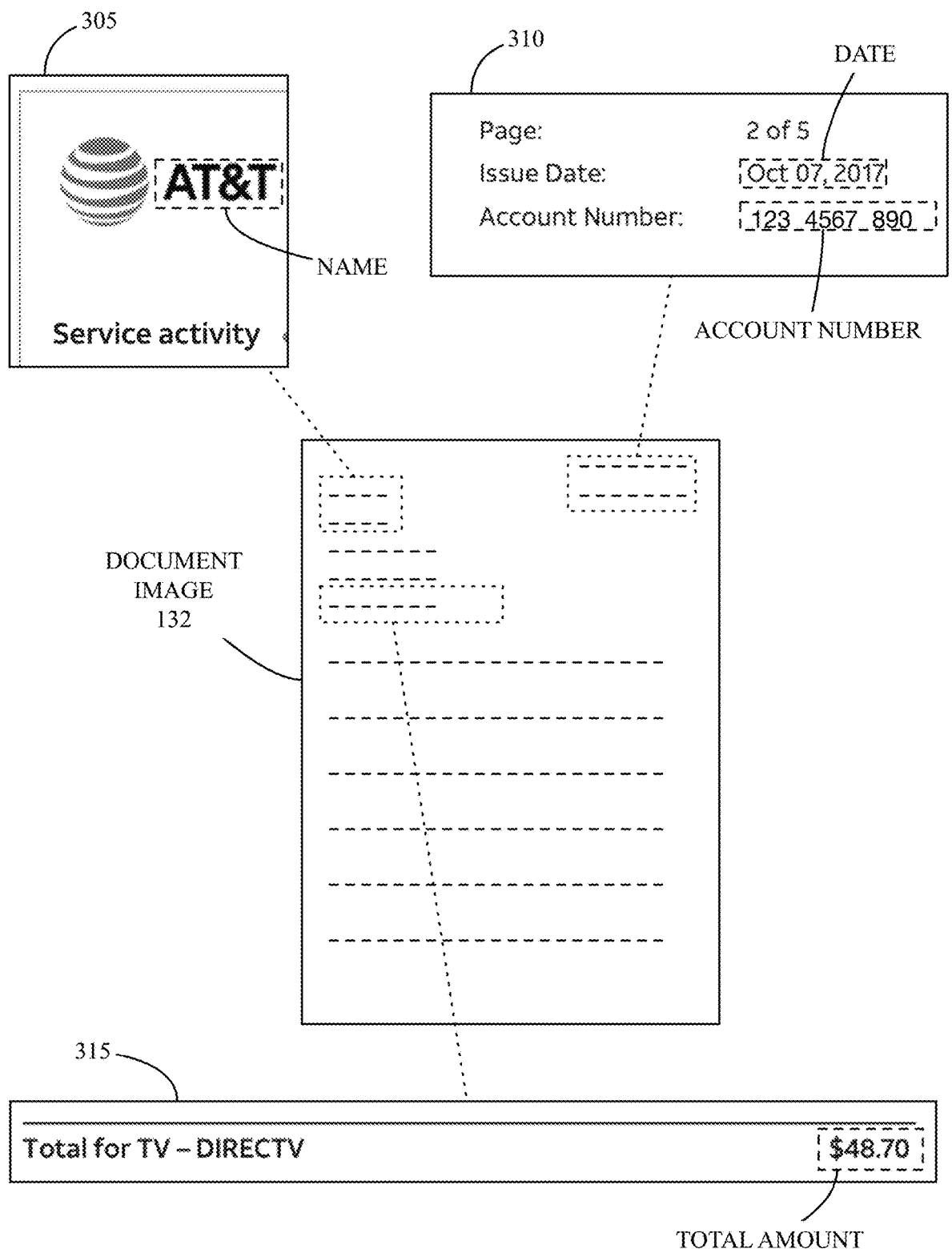
FIG. 3 illustrates a document image communicated from a terminal of the environment to the DDES, in accordance with an example.

Referring to the figure, an example of the terminal 104 corresponds to a computer system such as a desktop computer, tablet, etc. The terminal 104 can correspond to a different type of computing device. An example of the terminal 104 has document images 132 stored thereon. An example of a document image 132 is illustrated in FIG. 3 and is described in further detail below. Examples of the document images 132 are represented in a graphical format such as JPEG (Joint Photographic Experts Group), TIFF (Tagged Image File Format), PNG (Portable Network Graphics), etc.

An example of the terminal 104 executes a browser or other interface that facilitates communicating the document images 132 to the DDES 102. As will be described in further detail below, during a training phase, the browser facilitates associating text content of one or more areas of the document image 132 with one or more keys. For example, the user of the terminal 105 can, via the browser, select words or combinations of words and associate the words or combinations of words with different keys or labels (e.g., name, account number, etc.).

The DDES 102 includes a memory 127, a processor 125, an input/output (I/O) subsystem 110, a machine learning logic (MLL) 115, and optical character recognition (OCR) logic. Examples of the DDES 102 can include other subsystems.

An example of the processor 125 corresponds to a stand-alone computer system such as an Intel®, AMD®, or ARM® based computer system or a different computer system and can include application-specific computer systems. An example of the computer system includes an operating system, such as Microsoft Windows®, Linux, Unix®, Mac OS®, or a different operating system.

An example of the processor 125 is in communication with the memory 127 and is configured to execute instruction code stored in the memory 127. In this regard, an example of the instruction code causes the processor 125 to control and coordinate various operations performed by the different subsystems of the DDES 102. Within examples, these operations include receiving image data associated with a document (i.e., document image 132), and extracting, by optical character recognition (OCR) logic of the DDES 102, metadata 400 from the image data (i.e., document image 132). The metadata 400 specifies sequences of text content items and text content item features associated with each text content item of the sequences of text content items. The operations further include determining, by a machine learning logic module of the DDES 102 and based on the sequences of text content items and the text content item features, one or more text content items associated with a key, and communicating, by the DDES 102 and to the client terminal 104, information that specifies the key and a corresponding value that is associated with the one or more text content items that are associated with the key.

An example of the I/O subsystem 110 includes one or more input, output, or input/output interfaces and is configured to facilitate communications with entities outside of the DDES 102, such as the terminal 104. In this regard, an example of the I/O subsystem 110 is configured to dynamically determine the communication methodology utilized by entities of the environment 100 and to communicate information to the entities with an interface that uses a determined communication methodology. For example, the I/O subsystem 110 can determine that a first entity utilizes a RESTful API and can, therefore, communicate with the entity using an interface that uses a RESTful communication methodology.

An example of the MLL 115 corresponds to hardware, software, or a combination thereof that is specifically configured to implement or assist in the implementation of various supervised and unsupervised machine learning models. An example of the MLL 115 implements a Holt-Winters algorithm, exponential time smoothing (ETS) algorithm, an artificial neural network (ANN), a recurrent neural network (RNN), a seasonal autoregressive moving average (SARIMA) algorithm, a network of long short-term memories (LSTM), and/or a gated recurring unit (GRU) algorithm. Examples of the MLL 115 can implement other machine learning logic.

An example of the OCR logic 120 is configured to receive an image specified in terms of pixels and to generate metadata 400 that specifies the text content of the image. For instance, an example of the OCR logic 120 is configured to generate metadata 400 from images specified in a graphical format such as JPEG (Joint Photographic Experts Group), TIFF (Tagged Image File Format), PNG (Portable Network Graphics), etc. An example of the OCR logic 120 includes or is in communication with a library that includes various logic modules specifically configured to perform OCR operations, such as the ABBYY FineReader library by ABBYY Co.

It is contemplated that any of the subsystems referenced herein can correspond to a stand-alone computer system such as an Intel®, AMD®, or Arm® based computer system or a different computer system and can include application-specific computer systems. The computer systems can include an operating system, such as Microsoft Windows®, Linux, Unix®, or another operating system. It is also contemplated that operations performed by the various subsystems can be combined into a fewer or greater number of subsystems to facilitate speed scaling, cost reductions, etc.

Figure 2:
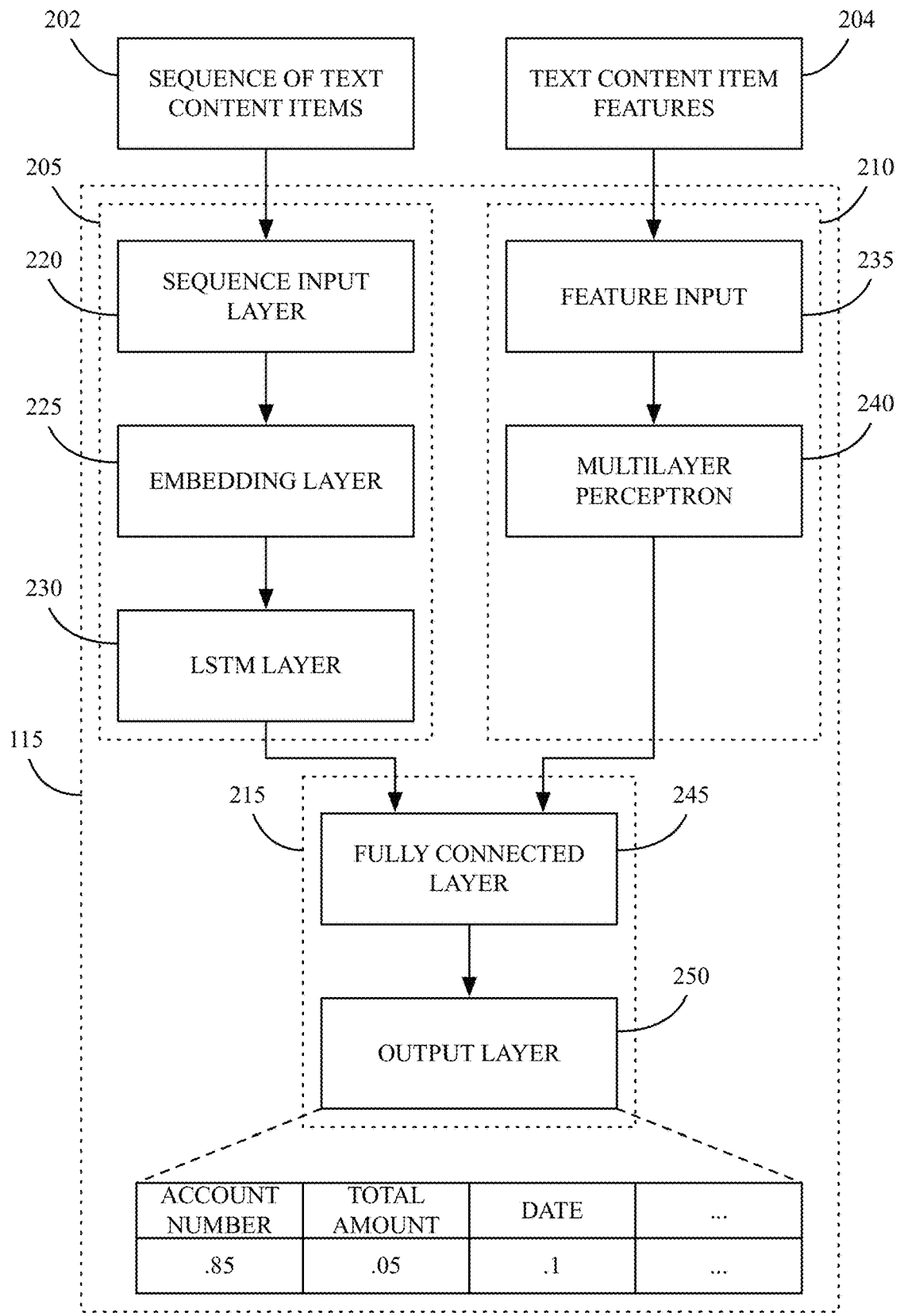
FIG. 2 illustrates machine learning logic (MLL) of a document data extraction system (DDES) of the environment, in accordance with an example.

FIG. 2 illustrates an example of the MLL 115. Referring to the figure, the MLL 115 includes first logic 205, second logic 210, and third logic 215. An example of the first logic 205 includes a sequence input layer 220, an embedding layer 225, and a LSTM layer 230. As will be described in additional detail below, the sequence input layer 220 is configured to receive sequences of text content items 202. In this regard, the size of the sequence input layer can correspond to the number of text content items intended to be processed by the first logic 205. For example, the first logic 205 can be configured to have a size of four to facilitate processing a sequence of text content items 202 having four text content items such as "Page 1 of 2." The embedding layer 225 is configured to "vectorize" each word in the sequence. An example of the embedding layer 225 is Word2Vec. The output of the embedding layer 225 can be input into the LSTM layer 230.

An example of the second logic 210 includes a feature input layer 234 and a multilayer perceptron 240. The feature input layer 234 is configured to receive text content item features 204. Example text content item features 204 specify an amount of area in a document image 132 occupied by a corresponding text content item and a distance from an origin (e.g., center, lower left corner) of the document image 132 to the corresponding text content item. Other examples of text content item features 204 further specify a shape, morphological pattern, syntactic dependency, presence-of-hyphen indication, stop word indication, and style associated with a corresponding text content item. These aspects are described in further detail below.

An example of the third logic 215 includes a fully connected layer 245 and an output layer 250. The fully connected layer 245 is configured to combine the output of the first logic 205 and the output of the second logic 210. The output layer 250 is configured to output a vector of probabilities, where each element of the vector is associated with one of a plurality of keys or labels. The probability associated with a given element of the vector represents the probability that a particular text content item is associated with the key that is associated with the element.

FIG. 3 illustrates an example of a document image 132 communicated from the terminal 104 to the DDES 102. Examples of the document image 132 correspond to a JPEG image, TIFF image, PNG image, etc. The illustrated document image 132 can, for example, correspond to an invoice. In this regard, an example of the document image 132 includes information related to various services provided by a service provider. For instance, in an example, the service provider name is specified in a first region 305 of the document image 132. An invoice date and customer account number is specified in a second region 310 of the document image 132. A total amount owed is specified in a third region 315 of the document image 132. In some examples, dates of services, services provided, costs for the services, taxes, fees, etc., are specified on the document image 132.

As noted above, in an example, the user of the terminal 104 associates text content of one or more areas of the document image 132 with one or more keys during a training phase. In this regard, in an example, a browser or other interface of the terminal 104 is configured to facilitate selection of text content items of the document image 132 (e.g., by dragging a rectangular selection box around the text content item) and specifying a key or label associated with the selected text content item (e.g., by right-clicking on the selection and specifying the key/label in an input field of a popup menu). For example, the user can select the word "AT&T" in the first region 305, as indicated by the dashed lines, and associate the selection with the key/label "NAME." Likewise, the user can select the words/character sequences "Oct," "of," and "2017" in the second region 310 and associate the words/character sequences with the key/label "DATE." The user can select the words/character sequences "123," "4567," and "890" in the second region 310 and associate the words/character sequences with the key/label "ACCOUNT NUMBER." The user can select the character sequences "$48.70" and associate the character sequences with the key/label "TOTAL AMOUNT."

FIG. 4A illustrates a portion of an example of metadata 400 extracted by the OCR logic 120. As noted above, the DDES 102 utilizes OCR logic 120 to extract metadata 400 from the document image 132. The metadata 400 specifies sequences of text content items 405 and text content item features (410A, 410B) associated with each text content item of the sequences of text content items 405. Referring to the figure, the example metadata 400 includes the sequence of text content items (e.g., "Page: 2 of 5 Issue Date: Oct 07, 2017 Account Number: 123 4567 890"). Text content item features (410A, 410B) associated with the text content item "Page:" correspond to the key/value pairs "Area": 672 and "DistanceToOrigin": 1310.44. Text content item features (410A, 410B) associated with the text content item "2" correspond to the key/value pairs "Area": 448.0 and "DistanceToOrigin": 1376.26.

An example of the DDES 102 is further configured to determine additional text content item features associated with each text content item. For instance, examples of additional text content item features specify one or more of: a shape, morphological pattern, syntactic dependency, presence-of-hyphen indication, stop word indication, and style associated with a corresponding text content item. An example of the DDES 102 includes regular expression pattern matching logic that facilitates determining the additional text content item features.

Table 1 below lists various text content item features that can be associated with text content items.

TABLE 1

| Word | Shape | Morphological pattern | Syntactic Dependency | Presence of Hyphen | ... |
|---|---|---|---|---|---|
| Page | Xxxx | | | F | ... |
| 1 | d | | | F | ... |
| of | xx | | | F | ... |
| 2 | d | | | F | ... |
| Account | Xxxxxxx | | | F | ... |
| Number | Xxxxxx | | | F | ... |
| 925685-1235 | dddddd-dddd | | | T | ... |
| 421 | ddd | | | F | ... |
| 8 | d | | | F | ... |
| Billing | Xxxxxxx | | | F | ... |
| Date | Xxxx | | | F | ... |
| Mar | Xxx | | | F | ... |
| 22 | dd | | | F | ... |
| 2017 | dddd | | | F | ... |

| Word | ... | Is Stop Word | Area | Style | Relative Position |
|---|---|---|---|---|---|
| Page | ... | F | N | N | N |
| 1 | ... | F | N | N | N |
| of | ... | F | N | N | N |
| 2 | ... | F | N | N | N |
| Account | ... | F | N | N | N |
| Number | ... | F | N | N | N |
| 925685-1235 | ... | F | N | N | N |
| 421 | ... | F | N | N | N |
| 8 | ... | F | N | N | N |
| Billing | ... | F | N | N | N |
| Date | ... | F | N | N | N |
| Mar | ... | F | N | N | N |
| 22 | ... | F | N | N | N |
| 2017 | ... | F | N | N | N |

Referring to Table 1, the Word column lists words or text content items that belong to a sequence of text content items. In this case, the word sequence corresponds to "Page 1 of 2 Account Number 925685-125 421 8 Billing Date Mar 22, 2017." The shape column specifies the format of each word. For example, the shape "Xxxx" indicates that the corresponding text content item begins with a capital letter followed by three lower case letters. The shapes "d," "dd," etc. indicate that the corresponding text content item is one digit, two digits, etc.

The Morphological Pattern column indicates whether the corresponding text content item is a verb, noun, etc. An example of the DDES 102 includes a lookup table to match a particular text content item to a particular morphological pattern.

The Presence of Hyphen column specifies a value of T (true) or F(false) to indicate whether a hyphen is present in the text content item. The Is Stop Word column specifies a value of T (true) or F (false) to indicate whether the text content item is at the end of a sentence.

The Area column and the Relative Position column specify a numeric value (denoted N) that corresponds to the area and relative position of the text content item within the document image 132. In an example, the values for the area and relative position are obtained from the metadata 400 extracted by the OCR logic. (See text content item features (410A, 410B).)

Figure 4B:
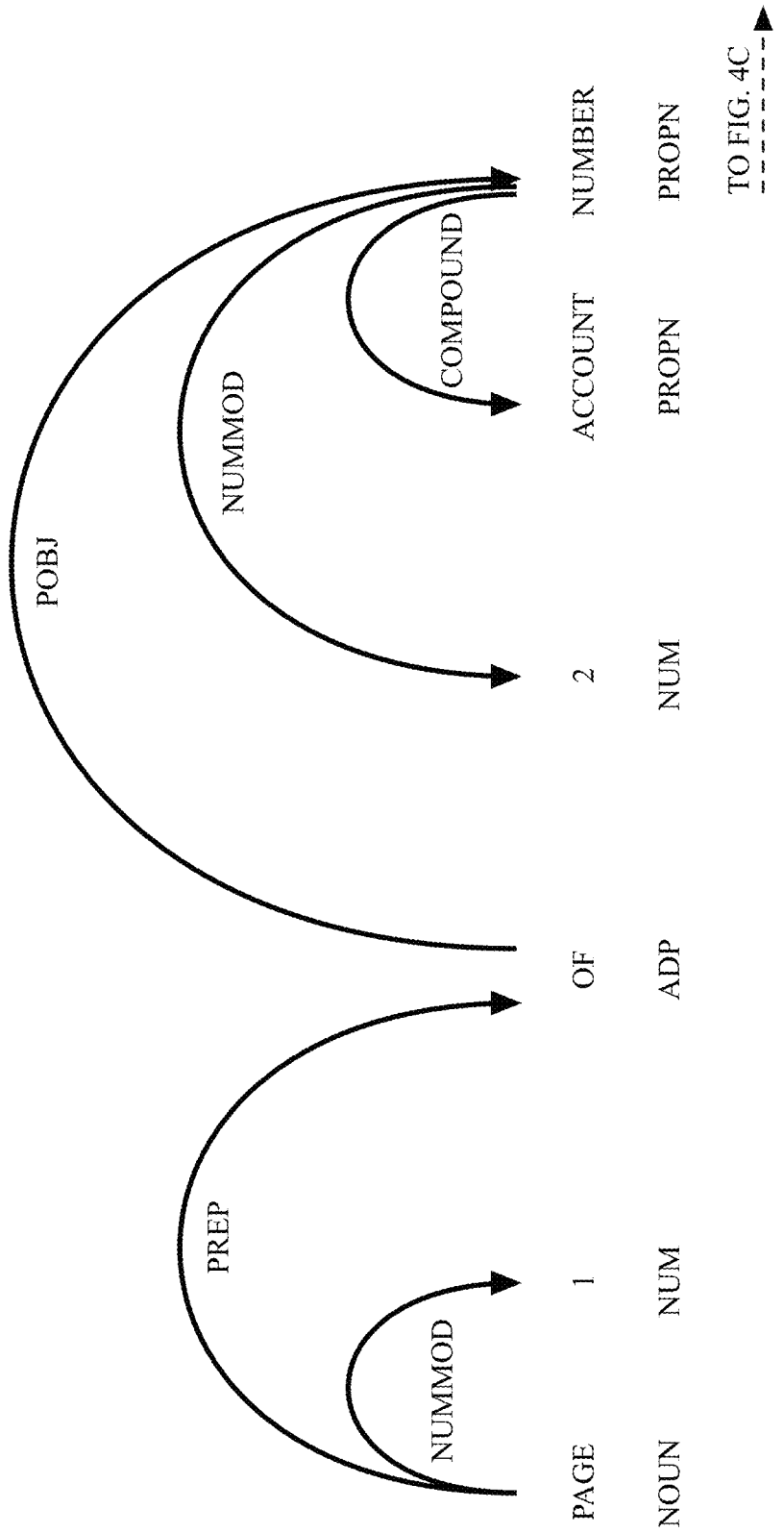
FIGS. 4B-4D illustrate a graph of the syntactic dependency or relationship between a sequence of words, in accordance with an example.
Figure 4C:
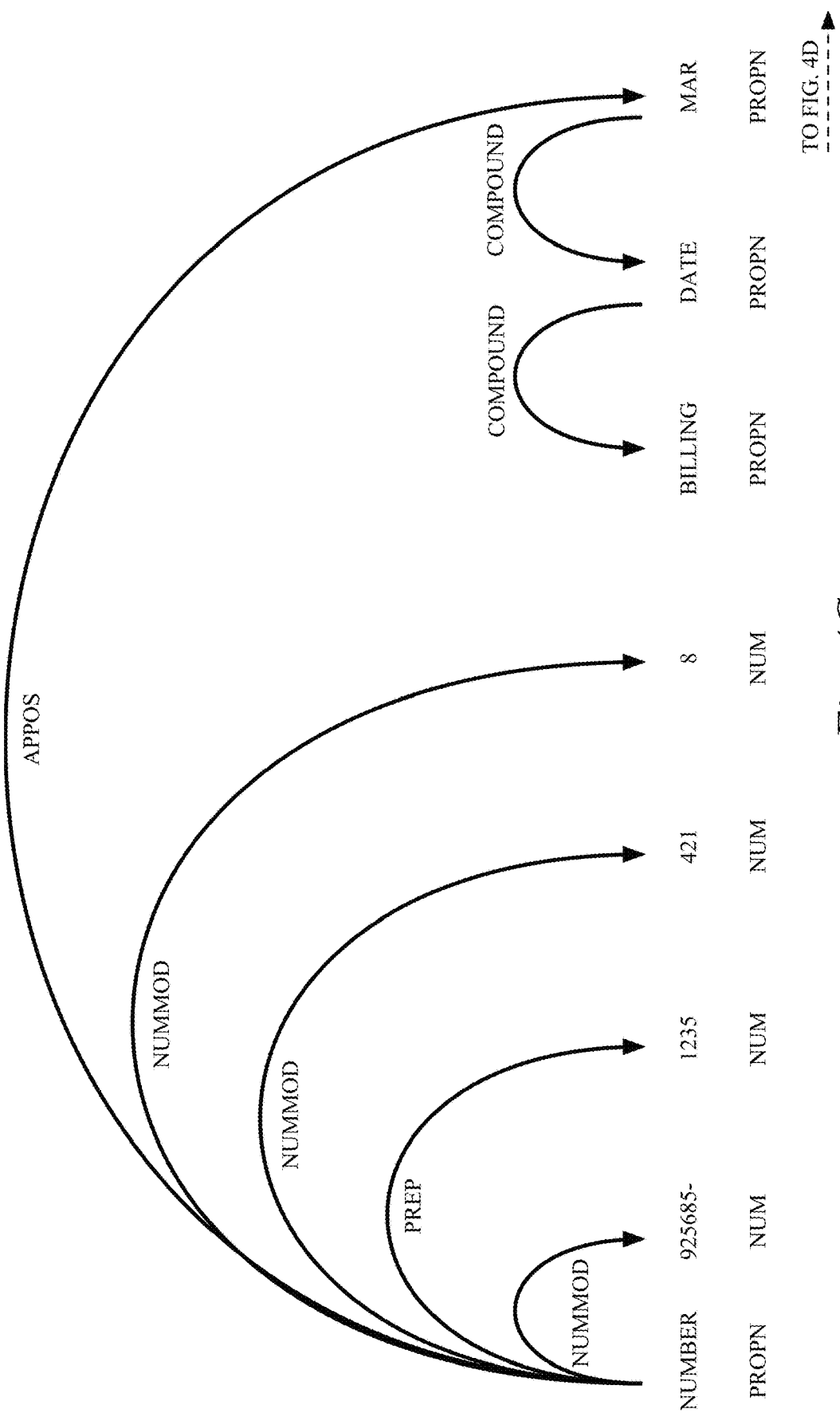
Figure 4D:
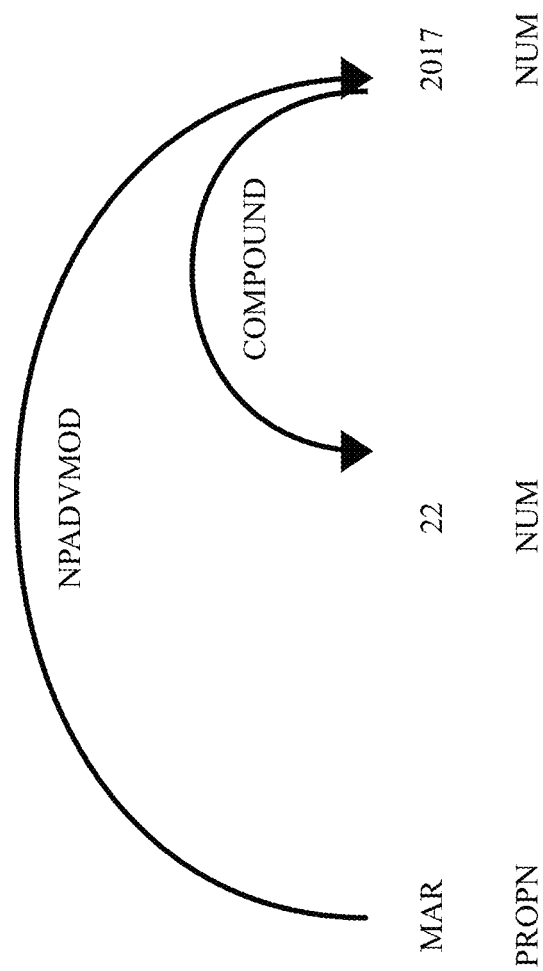

Syntactic dependency defines the relationships between groups of characters or words of a sequence. FIGS. 4B-4D illustrate an example graph of the syntactic dependency or relationship between the sequence of words "PAGE 1 OF 2 ACCOUNT NUMBER 925685-1235 421 8 BILLING DATE MAR 22, 2017." The arrows between the words indicate a dependency between the words. The word classes and the types of dependencies between the words shown in the graph are defined in Table 2 below.

TABLE 2

| Word Relationship Types | |
|---|---|
| NUMMOD | Numeric modifier. |
| PREP | Prepositional modifier. |
| COUMPOUND | A compound word. |
| POBJ | Object of preposition. |
| PUNCT | Punctuation. |
| APPOS | Appositional modifier. |
| Word Classes | |
| NOUN | Sequence of characters correspond to a noun. |
| NUM | Sequence of characters correspond to a number. |
| ADP | Sequence of characters correspond to an adposition. |
| PROPN | Sequence of characters correspond to a proper noun. |

Figure 5:
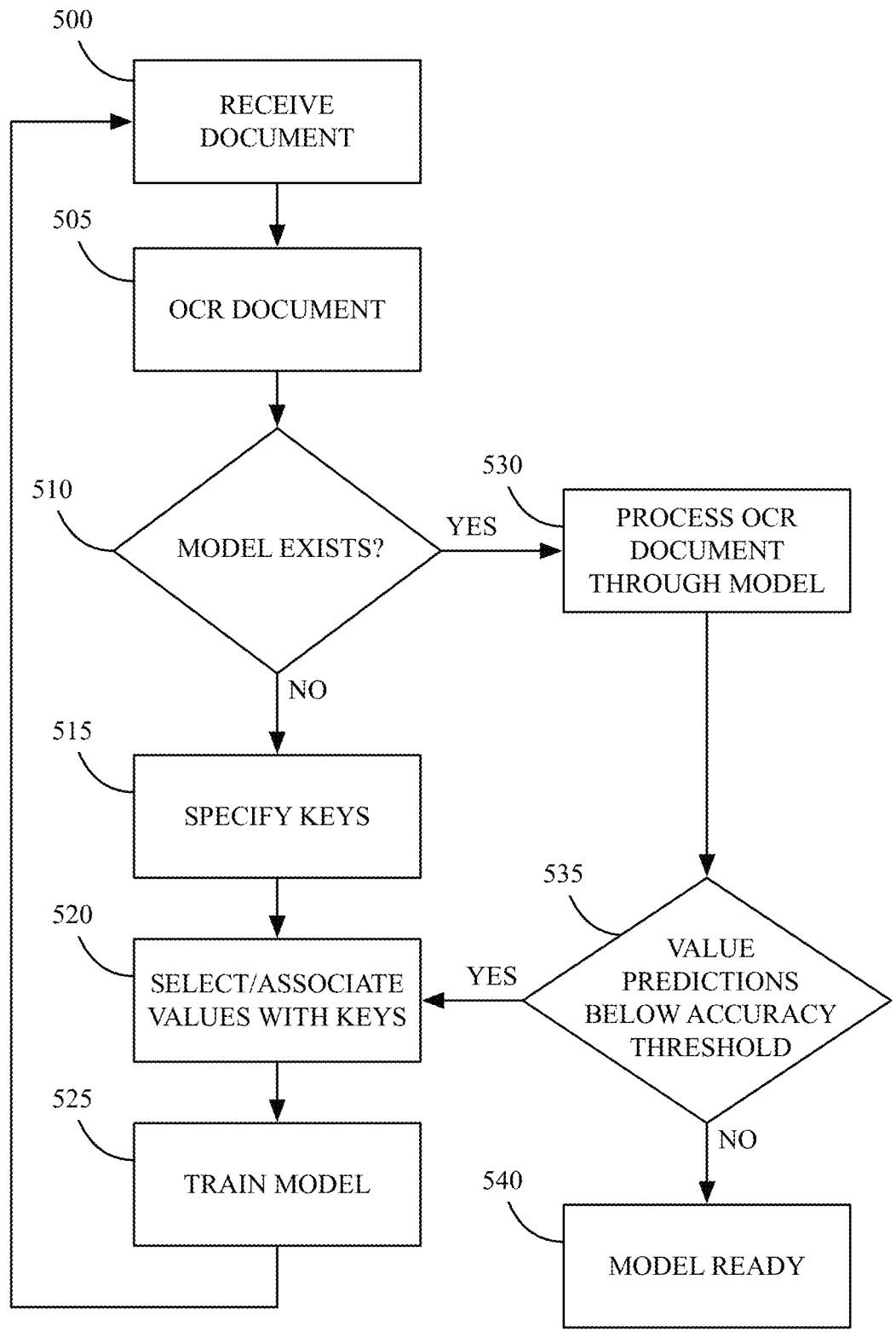
FIG. 5 illustrates operations performed by the DDES, in accordance with an example.
Figure 6:
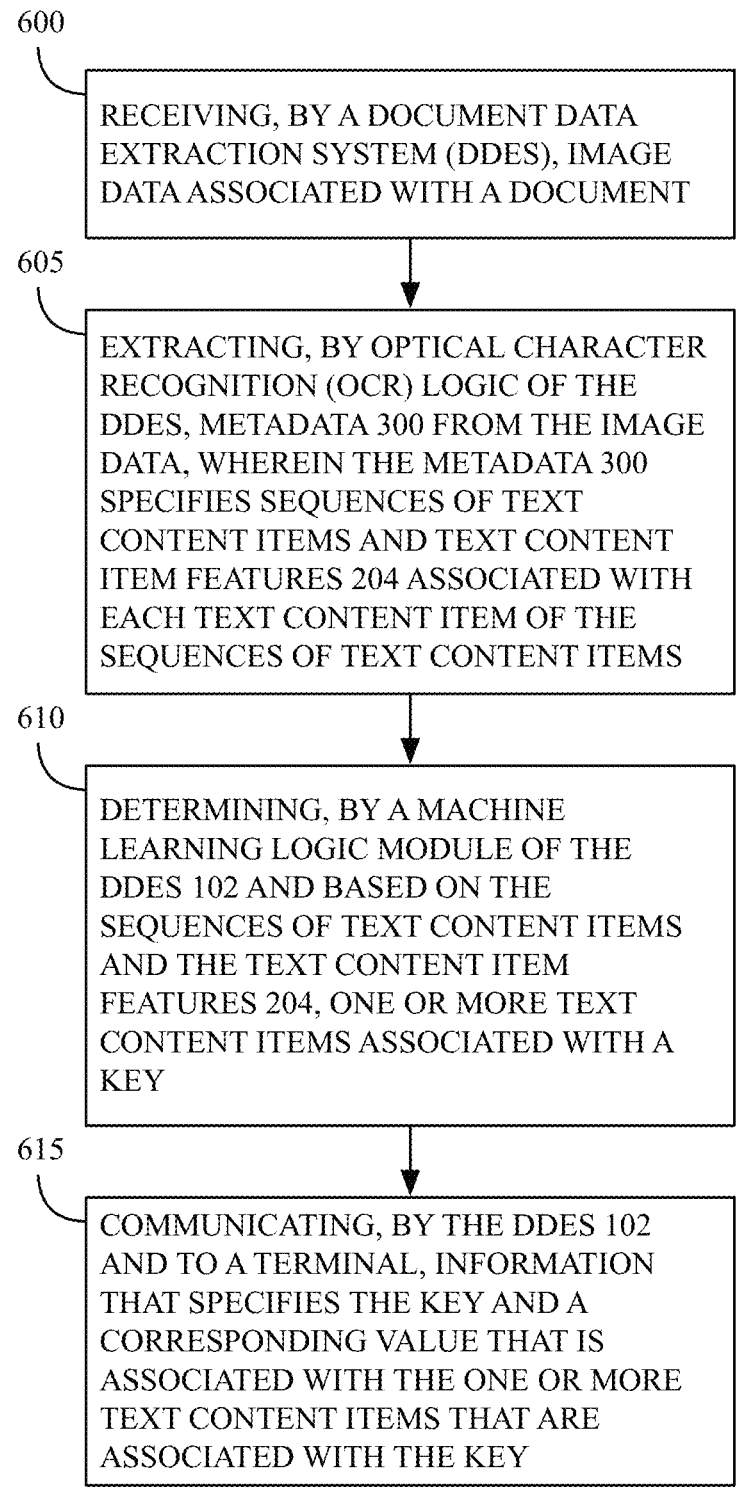
FIG. 6 illustrates a computer-implemented method that can be performed by one or more of the systems described above, in accordance with an example.

FIG. 5 illustrates examples of operations that can be performed by the DDES 102. It should be understood that one or more of the operations can be implemented in instruction code that can be stored in the memory of the respective systems. The instruction code can be executed by one or more processors of these systems, alone or in combination with other subsystems of these systems, to cause the respective systems to perform the operations illustrated in the figures.

At block 500, a document image 132 is received. For instance, in an example, a user, via the terminal 104, communicates the document image 132 to the DDES 102. An example of the document image 132 can be represented in a graphical format such as JPEG (Joint Photographic Experts Group), TIFF (Tagged Image File Format), PNG (Portable Network Graphics), etc. An example of the document image 132 can correspond to an invoice. In this regard, the document image 132 can include information related to various services provided by a service provider. For example, the service provider name can be specified in a first region 305 of the document, an invoice date, and customer account number can be specified in a second region 310 of the document image 132. A total amount owed can be specified in a third region 315 of the document image 132. In some examples, dates of services, services provided, costs for the services, taxes, fees, etc., are specified in the document image 132.

At block 505, the document image 132 is OCR'd. In an example, the DDES 102 includes OCR logic 120, and the OCR logic 120 is utilized to extract metadata 400 from the image data. An example of the metadata 400 specifies sequences of text content items 405 and text content item features (410A, 410B) associated with each text content item of the sequences of text content items 405.

At block 510, the DDES 102 determines whether a model exists. That is, the DDES 102 determines whether a model for determining one or more text content items associated with a key exist. In this regard, an example of the DDES 102 includes a repository of model configurations that are utilized to configure the MLL 115 to determine text content items that are associated with previously specified keys. In an example, each model is associated with a different type of document. For example, a first model can be used to configure the MLL 115 to determine text content items that are associated with previously specified keys for a first type of invoice document (e.g., an invoice associated with a particular service provider). A second model can be used to configure the MLL 115 to determine text content items that are associated with previously specified keys for a second type of invoice document (e.g., an invoice associated with a different service provider).

If, at block 510, a model does not exist, then at block 515, keys can be specified. And at block 520, the keys can be associated with values. For example, keys or labels, such as Name, Account Number, Total, etc. can be specified. The keys correspond to aspects of the document image 132 for which the user would like to extract information.

In an example, the DDES 102 communicates a version of the document image 132 that includes the metadata 400 determined by the OCR logic 120 to the terminal 104. The user, via an interface of the terminal 104, can select text content items of the document image 132 and can specify keys/labels to associate with the text content items. For example, referring to FIG. 3, the user can select the text content item "AT&T" in document image 132 of the document image 132 and can assign the key/label "Name" to the selected text content item. The user can select the sequence of text content items "OCT 07, 2018" and can assign the key/label "Date" to the selected text content item. The user can select the sequence of text content items that specify "123 4567 890" and can assign the key/label "Account Number" to the selected text content item. The user can select the text content item that specifies "$48.70" and can assign the key/label "Total amount" to the selected text content item. The selections made by the user can be communicated to the DDES 102.

At block 525, the model is trained. That is, the DDES 102 utilizes the information provided by the user to train a model to associate text content items with the keys/labels specified by the user. Referring to FIG. 2, sequences of text content items 202 from the metadata 400 associated with the document image 132 can be input into the first logic 205 of the MLL 115. For example, the first logic 205 may be configured to process a sequence of four text content items. In this case, a text content sequence such as "Page 1 of 2" can be input into the first logic 205.

As noted above, the embedding layer "vectorizes" each word in the sequence. An example of the embedding layer is Word2Vec. The output of the embedding layer can be input into the LSTM layer 230.

Simultaneously, text content item features 204 can be input into the second logic 210 of the MLL 115 and processed via a multilayer perceptron 240 of the second logic 210. The text content item features 204 can correspond to the features specified in the columns of Table 1. For example, the text content item features 204 can specify an amount of area in the document image 132 occupied by a corresponding text content item, and a distance from an origin (e.g., center, lower left corner) of the document image 132 to the corresponding text content item. Other examples of text content item features 204 specify a shape, morphological pattern, syntactic dependency, presence-of-hyphen indication, stop word indication, and style associated with a corresponding text content item.

Following the example above, if during a first iteration, the sequence "Page 1 of 2" is input into the first logic 205, text content item features 204 associated with the first text content item (i.e., "Page") are input into the second logic 210. In a second iteration, the sequence "1 of 2 Account" is input into the first logic 205, and text content item features 204 associated with the first text content item of the sequence (i.e., "1") are input into the second logic 210.

During each iteration, the output of the first logic 205 and the output of the second logic 210 are input into the fully connected layer 245 of the MLL 1152. For each of a plurality of keys, the fully connected layer 245 is configured to output a probability that the one or more text content items is associated with a particular key of the plurality. For example, suppose the keys/labels specified by the user were "ACCOUNT NUMBER," "TOTAL AMOUNT," and "DATE." In this case, the output of the fully connected layer 245 corresponds to a vector having a size equal to the number of keys (i.e., 3), and the value of each vector corresponds to the probability that the text content item being processed (e.g., "Page" during the first interaction) is associated with the corresponding key. For example, the output will indicate the probability that the term "Page" is associated with the keys "ACCOUNT NUMBER," "TOTAL AMOUNT," and "DATE." In an example, a Softmax algorithm is applied to the output layer values so that the sum of the probabilities of the vectors adds to one.

During training, weights of the various layers of the MLL 115 are adjusted to drive the probabilities of the vector to an expected outcome. For example, when the sequence of text content items associated with the account number (e.g., "123," "4567," and "890") are being processed, the weights are adjusted to increase the probability specified in the output associated with the key "ACCOUNT NUMBER." When the sequence of text content items associated with the date (e.g., "Oct," "of," and "2017") are being processed, the weights are adjusted to increase the probability specified in the output associated with the key "DATE." In an example, backpropagation is utilized to drive the weights to expected outputs over the iterations required to process the sequence of text content items, and corresponding text content item features 204.

After training has been completed for a particular document, the operations repeat from block 500.

During a second pass, a second document image 132 can be received at block 500 and OCR's at block 505, as described above. If at block 510, a model does not exist, the operations at blocks 515-525 are repeated.

If at block 510, a model does exist, then at block 530, the second document image 132 can be processed through the model. After processing, an example of the DDES 102 generates a table of key/value pairs. The values correspond to one or more text content items determined by the model to be most closely associated with a particular key. For example, after processing the document image 132 of FIG. 3, the DDES 102 can generate Table 3 below.

TABLE 3

| Key/Label | Value |
| --- | --- |
| NAME | AT&T |
| DATE | Oct. 7, 2017 |
| ACCOUNT NUMBER | 123 4567 890 |
| TOTAL AMOUNT | $48.70 |

In an example, after processing, the information in Table 3 can be communicated to the user (e.g., via the terminal 104).

At block 535, a determination is made as to whether the predictions made by the model are below an accuracy threshold. For example, the user may review the table communicated above to determine whether the key/value pairing is correct.

If at block 535, the values are determined to be below an accuracy threshold, then the document image 132 can be processed via the operations at block 520. In this case, the user can identify the correct text content item or sequence of text content items to be associated with the key and can submit the document image 132 to the DDES 102 for further training. In this case, the model will be trained with another document. As this process repeats, the accuracy of the model will improve. In an example, an accuracy level of about 95% is achieved after training the model with 5-7 document images 132 of the same type (e.g., the same invoice format, but with different values).

If at block 535, the prediction accuracy is determined to be at or above the accuracy threshold, then at block 540, the model will be deemed ready. That is, the model can be considered sufficiently accurate to process documents of a particular type.

FIG. 8 illustrates an example of a computer-implemented method that can be performed by one or more of the examples described above. Block 800 involves receiving, by a document data extraction system (DDES), image data associated with a document.

Block 805 involves extracting, by optical character recognition (OCR) logic of the DDES, metadata from the image data, wherein the metadata specifies sequences of text content items and text content item features associated with each text content item of the sequences of text content items.

Block 810 involves determining, by a machine learning logic module of the DDES and based on the sequences of text content items and the text content item features, one or more text content items associated with a key.

Block 815 involves communicating, by the DDES and to a terminal, information that specifies the key and a corresponding value that is associated with the one or more text content items that are associated with the key.

In some examples, each text content item feature specifies an amount of area in the image data occupied by a corresponding text content item, and a distance from an origin of the image data to the corresponding text content item.

Some examples involve determining, by the DDES, additional text content item features associated with each text content item. The additional text content item features specify one or more of: a shape, morphological pattern, syntactic dependency, presence-of-hyphen indication, stop word indication, and style associated with a corresponding text content item.

In some examples, determining the one or more text content items associated with a key further involves receiving, by first logic of the machine learning logic module that includes a recurrent neural network layer, the sequences of text content items; receiving, by second logic of the machine learning logic module that includes a multilayer perceptron, the text content item features; and combining, by third logic of the machine learning logic module that includes a fully connected layer, an output of the first logic and an output of the second logic. For each of a plurality of keys, the fully connected layer outputs a probability that the one or more text content items is associated with a particular key of the plurality.

Some examples involve determining a document type; and selecting, based on the document type, a machine learning logic module, from a plurality of machine learning logic modules, that is configured to determine one or more text content items associated with a key for a document of the document type.

Some examples involve, responsive to determining that a machine learning logic module for the document type does not exist, generating a user interface that facilitates training a machine learning logic module to determine one or more text content items associated with a key for a document of the document type; and associating a trained machine learning logic module with the document type.

In some examples, the user interface facilitates mapping one or more text content items of a training document to corresponding one or more keys associated with the one or more text content items.

Some examples involve, responsive to determining that a prediction accuracy of a particular machine learning logic module is below an accuracy threshold, training the machine learning logic module with another document of the document type.

Figure 7:
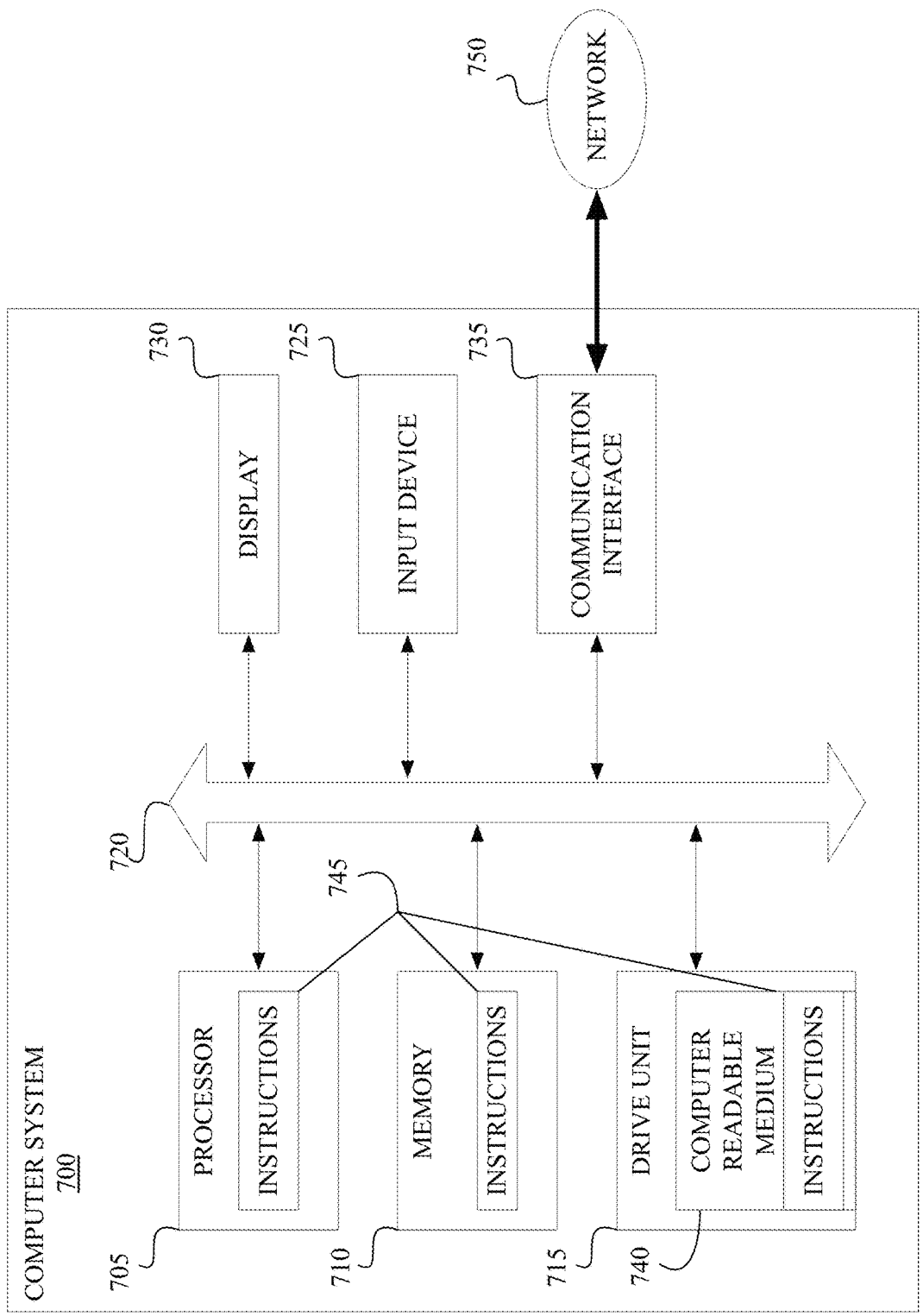
FIG. 7 illustrates a computer system that can form part of or implement any of the systems or devices of the environment, in accordance with an example.

FIG. 7 illustrates an example of a computer system 700 that can form part of or implement any of the systems and/or devices described above. The computer system 700 can include a set of instructions 745 that the processor 705 can execute to cause the computer system 700 to perform any of the operations described above. An example of the computer system 700 can operate as a stand-alone device or can be connected, e.g., using a network, to other computer systems or peripheral devices.

In a networked example, the computer system 700 can operate in the capacity of a server or as a client computer in a server-client network environment, or as a peer computer system in a peer-to-peer (or distributed) environment. The computer system 700 can also be implemented as or incorporated into various devices, such as a personal computer or a mobile device, capable of executing instructions 745 (sequential or otherwise), causing a device to perform one or more actions. Further, each of the systems described can include a collection of subsystems that individually or jointly execute a set, or multiple sets, of instructions to perform one or more computer operations.

The computer system 700 can include one or more memory devices 710 communicatively coupled to a bus 720 for communicating information. In addition, code operable to cause the computer system to perform operations described above can be stored in the memory 710. The memory 710 can be random-access memory, read-only memory, programmable memory, hard disk drive, or any other type of memory or storage device.

The computer system 700 can include a display 730, such as a liquid crystal display (LCD), a cathode ray tube (CRT), or any other display suitable for conveying information. The display 730 can act as an interface for the user to see processing results produced by processor 705.

Additionally, the computer system 700 can include an input device 725, such as a keyboard or mouse or touchscreen, configured to allow a user to interact with components of system 700.

The computer system 700 can also include a disk or optical drive unit 715. The drive unit 715 can include a computer-readable medium 740 in which the instructions 745 can be stored. The instructions 745 can reside completely, or at least partially, within the memory 710 and/or within the processor 705 during execution by the computer system 700. The memory 710 and the processor 705 also can include computer-readable media as discussed above.

The computer system 700 can include a communication interface 735 to support communications via a network 750. The network 750 can include wired networks, wireless networks, or combinations thereof. The communication interface 735 can enable communications via any number of wireless broadband communication standards, such as the Institute of Electrical and Electronics Engineering (IEEE) standards 802.11, 802.12, 802.16 (WiMAX), 802.20, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

What is claimed is:

1. A method performed by a computing system, the method comprising:
   receiving, by a document data extraction system (DDES), image data associated with a document;
   extracting, by optical character recognition (OCR) logic of the DDES, metadata from the image data, wherein the metadata specifies sequences of text content items and text content item features associated with each text content item of the sequences of text content items;
   determining, by a machine learning logic module of the DDES and based on the sequences of text content items and the text content item features, one or more text content items associated with a key; and
   communicating, by the DDES and to a terminal, information that specifies the key and a corresponding value that is associated with the one or more text content items that are associated with the key.

2. The method according to claim 1, wherein each text content item feature specifies an amount of area in the image data occupied by a corresponding text content item, and a distance from an origin of the image data to the corresponding text content item.

3. The method according to claim 2, further comprising:
   determining, by the DDES, additional text content item features associated with each text content item, wherein the additional text content item features specify one or more of: a shape, morphological pattern, syntactic dependency, presence-of-hyphen indication, stop word indication, and style associated with a corresponding text content item.

4. The method according to claim 1, wherein determining the one or more text content items associated with a key further comprises:
   receiving, by first logic of the machine learning logic module that includes a recurrent neural network layer, the sequences of text content items;
   receiving, by second logic of the machine learning logic module that includes a multilayer perceptron, the text content item features; and
   combining, by third logic of the machine learning logic module that includes a fully connected layer, an output of the first logic and an output of the second logic, wherein for each of a plurality of keys, the fully connected layer outputs a probability that the one or more text content items is associated with a particular key of the plurality.

5. The method according to claim 1, further comprising:
   determining a document type; and
   selecting, based on the document type, a machine learning logic module, from a plurality of machine learning logic modules, that is configured to determine one or more text content items associated with a key for a document of the document type.

6. The method according to claim 5, further comprising:
   responsive to determining that a machine learning logic module for the document type does not exist, generating a user interface that facilitates training a machine learning logic module to determine one or more text content items associated with a key for a document of the document type; and
   associating a trained machine learning logic module with the document type.

7. The method according to claim 6, wherein the user interface facilitates
   mapping one or more text content items of a training document to corresponding one or more keys associated with the one or more text content items.

8. The method according to claim 6, further comprising:
   responsive to determining that a prediction accuracy of a particular machine learning logic module is below an accuracy threshold, training the machine learning logic module with another document of the document type.

9. A document data extraction system (DDES) comprising:
   a memory that stores instruction code; and
   a processor in communication with the memory, wherein the instruction code is executable by the processor to perform operations comprising:
   receiving, by the document data extraction system (DDES), image data associated with a document;
   extracting, by optical character recognition (OCR) logic of the DDES, metadata from the image data, wherein the metadata specifies sequences of text content items and text content item features associated with each text content item of the sequences of text content items;

determining, by a machine learning logic module of the DDES and based on the sequences of text content items and the text content item features, one or more text content items associated with a key; and communicating, by the DDES and to a terminal, information that specifies the key and a corresponding value that is associated with the one or more text content items that are associated with the key.

10. The system according to claim 9, wherein each text content item feature specifies an amount of area in the image data occupied by a corresponding text content item, and a distance from an origin of the image data to the corresponding text content item.

11. The system according to claim 10, wherein the operations further comprise:

determining, by the DDES, additional text content item features associated with each text content item, wherein the additional text content item features specify one or more of: a shape, morphological pattern, syntactic dependency, presence-of-hyphen indication, stop word indication, and style associated with a corresponding text content item.

12. The system according to claim 9, wherein in determining the one or more text content items associated with a key, the operations further comprise:

receiving, by first logic of the machine learning logic module that includes a recurrent neural network layer, the sequences of text content items;

receiving, by second logic of the machine learning logic module that includes a multilayer perceptron, the text content item features; and combining, by third logic of the machine learning logic module that includes a fully connected layer, an output of the first logic and an output of the second logic, wherein for each of a plurality of keys, the fully connected layer outputs a probability that the one or more text content items is associated with a particular key of the plurality.

13. The system according to claim 9, wherein the operations further comprise:

determining a document type; and selecting, based on the document type, a machine learning logic module, from a plurality of machine learning logic modules, that is configured to determine one or more text content items associated with a key for a document of the document type.

14. The system according to claim 13, wherein the operations further comprise:

responsive to determining that a machine learning logic module for the document type does not exist, generating a user interface that facilitates training a machine learning logic module to determine one or more text content items associated with a key for a document of the document type; and associating a trained machine learning logic module with the document type.

15. The system according to claim 14, wherein the user interface facilitates mapping one or more text content items of a training document to corresponding one or more keys associated with the one or more text content items.

16. The system according to claim 14, wherein the operations further comprise:

responsive to determining that a prediction accuracy of a particular machine learning logic module is below an accuracy threshold, training the machine learning logic module with another document of the document type.

17. A non-transitory computer-readable medium having stored thereon instruction code, wherein the instruction code is executable by a processor for causing the processor to perform operations comprising:

receiving, by a document data extraction system (DDES), image data associated with a document;

extracting, by optical character recognition (OCR) logic of the DDES, metadata from the image data, wherein the metadata specifies sequences of text content items and text content item features associated with each text content item of the sequences of text content items;

determining, by a machine learning logic module of the DDES and based on the sequences of text content items and the text content item features, one or more text content items associated with a key; and communicating, by the DDES and to a terminal, information that specifies the key and a corresponding value that is associated with the one or more text content items that are associated with the key.

18. The non-transitory computer-readable medium according to claim 17, wherein each text content item feature specifies an amount of area in the image data occupied by a corresponding text content item, and a distance from an origin of the image data to the corresponding text content item.

19. The non-transitory computer-readable medium according to claim 18, wherein the operations further comprise:

determining, by the DDES, additional text content item features associated with each text content item, wherein the additional text content item features specify one or more of: a shape, morphological pattern, syntactic dependency, presence-of-hyphen indication, stop word indication, and style associated with a corresponding text content item.

20. The non-transitory computer-readable medium according to claim 17, wherein in determining the one or more text content items associated with a key, the operations further comprise:

receiving, by first logic of the machine learning logic module that includes a recurrent neural network layer, the sequences of text content items;

receiving, by second logic of the machine learning logic module that includes a multilayer perceptron, the text content item features; and combining, by third logic of the machine learning logic module that includes a fully connected layer, an output of the first logic and an output of the second logic, wherein for each of a plurality of keys, the fully connected layer outputs a probability that the one or more text content items is associated with a particular key of the plurality.

* * * * *